United States Patent [19]

Chikatsu et al.

[11] 4,132,666
[45] Jan. 2, 1979

[54] PROCESS FOR PREPARING ALKALI METAL DISPERSIONS

[75] Inventors: Tatsusuke Chikatsu; Shinichi Shimokawa, both of Yokkaichi; Takao Miura, Ibaragi; Taro Okumura, Yokkaichi, all of Japan

[73] Assignee: Japan Synthetic Rubber Company, Limited, Tokyo, Japan

[21] Appl. No.: 819,590

[22] Filed: Jul. 27, 1977

Related U.S. Application Data

[63] Continuation-in-part of Ser. No. 731,422, Oct. 12, 1976, abandoned.

[30] Foreign Application Priority Data

Oct. 9, 1975 [JP] Japan .................................. 50-121981
Sep. 7, 1976 [JP] Japan .................................. 51-106928

[51] Int. Cl.² ............................................. B01J 13/00
[52] U.S. Cl. .................................. 252/309; 252/314; 252/359 R; 366/249

[58] Field of Search ................... 252/309, 314, 359 R; 366/249

[56] References Cited

U.S. PATENT DOCUMENTS

| 2,487,334 | 11/1949 | Hansley | 252/309 |
|---|---|---|---|
| 2,844,541 | 7/1958 | Work | 252/309 X |
| 3,580,862 | 5/1971 | Watson et al. | 252/309 |

*Primary Examiner*—Richard D. Lovering
*Attorney, Agent, or Firm*—Cooper, Dunham, Clark, Griffin & Moran

[57] ABSTRACT

A process for preparing alkali metal dispersions comprises continuously feeding a molten alkali metal, a dispersing agent, and an inactive dispersion liquid to a multipass emulsifier to form an emulsion of the molten alkali metal, and rapidly cooling the emulsion to a temperature at least 10° C lower than the melting point of the alkali metal.

7 Claims, 3 Drawing Figures

PROCESS FOR PREPARING ALKALI METAL DISPERSIONS

RELATED APPLICATION

This application is a continuation-in-part of previously filed, copending application Ser. No. 731,422 filed Oct. 12, 1976, and now abandoned.

BACKGROUND OF INVENTION

This invention relates to improved processes for preparing alkali metal dispersions.

An alkali metal dispersion may be employed, for example, as (1) an additive to a crude diolefinic monomer to purify it through removal from the system of the active hydride which forms by reaction with the alkali metal; (2) one of the essential materials for the preparation of an alfin catalyst; (3) a catalyst for the polymerization of dienic or monoolefinic monomers; and (4) a reducing agent for the preparation of higher alcohols from fatty acids or derivatives thereof. In addition, they are utilized for other chemical reactions.

Known processes for the preparation of such dispersions include those which employ high speed agitation, a colloid mill, a jet stream, or ultrasonic waves. According to those prior art processes, alkali metal dispersions are obtained by initially finely dividing an alkali metal by physical means, while heating the metal at a temperature above its melting point, and thereafter dispersing the minute particles thus formed in a dispersion medium, and finally cooling the product below the melting point of the alkali metal while maintaining it in a dispersed state.

Efforts are made to obtain particles of small uniform size, it being recognized that the larger the surface area, the higher the reactivity of the metal. Normally the particles in alkali metal dispersions range in particle size from 1 to $100\mu$, although it is preferred that the size does not exceed $20\mu$. This fineness, when combined with good dispersion stability, will provide ideal dispersions.

Batch and continuous procedures are utilized in the manufacture of alkali metal dispersions. The latter method is preferred for production on an industrial scale since the batch operation requires larger dispersion and cooling equipment and the quality of the resulting dispersion varies amongst different batches.

Techniques for continuously preparing alkali metal dispersions at temperatures above the melting points of the particular metals have been described, for example by I. Katt and M. Tashima: "Alkali Metal Dispersions," D. Van Nostrand Co., 1961, pp. 51–55, and in Japanese Patent Publication No. 16923/66.

The article cited above describes a typical process for continuously preparing alkali metal dispersions at temperatures above the melting point of the metals. The process necessitates extended retention times, at least about 30 minutes on the average, to reduce the size of particles. Therefore, large dispersion equipment is required and the production rate is low. Another disadvantage is that large particles are mixed in the resulting alkali metal dispersion because of operating difficulties which are inherent in the process.

A method of overcoming this latter difficulty is proposed in the cited Japanese Patent Publication. The method seeks to avoid the difficulties mentioned above, but, unfortunately, requires even larger and more complex equipment to obtain a reasonable production rate.

THE INVENTION

A facile and economic method has now been discovered to produce useful emulsions while avoiding the difficulties of the prior art. In accordance with the invention, a multipass emulsifier of the construction illustrated in FIG. 1 is utilized to produce alkali metal dispersions. A special advantage of the invention is that the particle size distribution in the dispersions is within a narrow range. Another, is that the multipass emulsifiers with a smaller capacity than any existing equipment are capable of preparing alkali metal dispersions at equivalent production rates. The need for long retention time or repeated feeding of material which is characteristic of conventional emulsifiers has been avoided, while concurrently permitting the manufacture of homogeneous dispersions.

The multipass emulsifier employed in the present invention includes a main cylinder having a cover on its upper surface, an auxiliary cylinder located with opposite ends open in the middle lower portion of the volume inside the main cylinder, and a turbine mounted in the auxiliary cylinder to cause an upward axial fluid flow, said main cylinder having an inlet formed in the portion facing the bottom of the auxiliary cylinder and also having an overflow gap provided between the upper periphery of the main cylinder and the cover communicating with an outlet or a discharge pipe surrounding the main cylinder.

The turbine of the multipass emulsifier usually is directly coupled to a motor for rotation at a speed between 500 and 20,000 r.p.m., preferably between 1,000 and 10,000 r.p.m. The turbine running inside the emulsifier forces the solution axially out of the vessel at a volume delivery rate which is a hundred times the intake rate of the emulsifier, and then draws in the discharged solution. The solution is circulated until the solution is completely emulsified.

For the process of the invention, the multipass emulsifier and associated pipings are equipped with means for maintaining the contents at a temperature above the melting point of the alkali metal being dispersed. Although the means usually used for this purpose are jackets which are conveniently oil heated, it will be appreciated that other heating means may also be employed.

The process of this invention for preparing an alkali metal dispersion may be considered as a two step process. In the first step, an emulsion is formed at a temperature above the melting point of the selected metal. In the second step, the hot emulsion is cooled to a temperature below the melting point of the metal to form a stable dispersion.

The second step appears simple but is in fact an important aspect of the invention. The alkali metal dispersion is very unstable as it cools from the molten, finely emulsified state to a solid, fine dispersion at below its melting point (normally, about 10° C to 20° C below the melting point). A slight shock can disturb the emulsion and bring about agglomeration of the alkali metal particles.

It is therefore a common practice to avoid rapid cooling, agitation, and transfer of the hot mixture. Instead, batches of it are stored in tanks and slowly cooled to the selected temperature while protecting against mechanical shock. A serious disadvantage of the procedure is that, because the material transfer to and from the cooling tank is forbidden during the cooling period, two or more cooling tanks are required. Even with these careful and expensive procedures, quality control is a problem due to lack of reproducibility amongst the batches.

It has now been found that alkali metal emulsions are particularly unstable and tend to agglomerate in a temperature range of about 10° C centering around the melting point of the metal, and that the step of cooling the emulsion down to a temperature lower than the melting point of the metal by at least 10° C, preferably 20° C, is important.

In one cooling procedure of the invention, the alkali metal emulsion is cooled by allowing it to flow through a tubular cooler at a linear velocity of not higher than 50 cm/sec.

When cooling a liquid continuously by means of a tubular cooler, the liquid usually flows through the cooler at a high linear velocity in order to achieve an increased cooling efficiency. The process of the invention, by contrast, is characterized by the passage of an alkali metal emulsion through a tubular cooler at a linear velocity which is not higher than about 50 cm/sec., preferably not higher than 20 cm/sec.

If the alkali metal emulsion flows through the tubular cooler at a linear velocity higher than about 50 cm/sec., it will develop agglomerates and will not make a uniform dispersion. At a linear velocity over about 80 cm/sec., the agglomerates will account for such a large percentage of the alkali metal dispersion that the cooling system often becomes clogged in a very short time.

The alkali metal dispersion cooled to a level at least 10° C lower than the melting point of the metal is continuously removed from the tubular cooler and, if necessary, the dispersion, depending on its intended use, is further cooled in a suitable cooler to ambient temperature or a lower temperature.

Alternatively, the alkali metal emulsion at a temperature above the melting point of the metal is continuously discharged into a dispersion medium under agitation, and cooled to a temperature not less than 10° C lower than the melting point of the metal, thereby rapidly cooling the emulsion to obtain continuously a stable alkali metal dispersion at a temperature below the melting point of the metal.

This cooling method presents a striking contrast to the prevailing technical concept which avoids agitation or other mechanical shock during cooling; see, for example, "Encyclopedia of Polymer Science and Technology," vol. 12, p. 615, 1970, starting at the 11th line from the bottom.

Either of these cooling methods, when combined with the afore-described method of producing the alkali metal emulsion in a multipass emulsifier, makes the continuous production of alkali metal dispersions possible.

Useful alkali metals for the process of the invention include sodium, lithium, and potassium. Sodium, lithium are desirable, and sodium is particularly desirable.

The identity of the dispersion liquid employed for the present process is not critical. It will, of course, be inert with respect to the alkali metal. It will also be selected with a view to the intended use of the dispersion. Typical examples of useful dispersion liquids include: aliphatic hydrocarbons, such as n-octane, n-nonane, n-decane, and trimethylpentane; alicyclic hydrocarbons, such as cyclohexane, cycloheptane, and dimethylcyclohexane; aromatic hydrocarbons, such as benzene, toluene, and xylene; and high-boiling hydrocarbon mixtures with boiling points of over 100° C fractionated from petroleum, such as kerosene and liquid paraffin. If the boiling point of the liquid is below the melting point of the metal, the process will be carried out under pressure.

In preparing alkali metal dispersions, it is customary to add a dispersing agent to the dispersion liquid in order to facilitate the emulsification and dispersion of the metal, and also to improve the stability of the emulsion and the product dispersion. These agents may be advantageously employed in the process of this invention. Among the useful dispersing agents are higher fatty acids, such as stearic acid and oleic acid; alkylaryl sulfonic acid; higher alcohols, sulfuric esters, and salts of these materials.

The dispersing agent is typically used in amounts up to about 5% by weight, preferably from 0.3 to 3% by weight, based on the weight of the alkali metal. The concentration of the alkali metal in the dispersion produced in the invention is normally less than 50% by weight, although more concentrated dispersions, for example up to 60%, can be produced. The most useful dispersions contain from 5 to 30% by weight of metal.

The temperature for the preparation of the alkali metal emulsion in the multipass emulsifier is higher than the melting point of the particular alkali metal. It is preferably from 181° to 220° C for lithium, from 98° to 140° C for sodium, and from 63° to 90° C for potassium. The temperature to which the emulsion is cooled is lower than the melting point of the particular metal by at least 10° C, preferably by more than 20° C.

The cooling apparatus employed to produce the alkali metal dispersions will be selected on the basis of the cooling method employed.

If a tubular cooler is utilized, it is usually in the form of a double pipe, with coolant constantly circulating through the space between the outer pipe and the inner pipe or through a jacket. It will be appreciated, however, that that this is not the only structure which will serve the purpose.

The tubular cooler may be characterized by the following specifications. The inside diameter of the pipe through which the liquid to be cooled is passed is R (in cm), the length of the outer pipe through which a coolant is passed is L (in cm), and the linear velocity and flow rate of the liquid to be cooled is V cm/sec. and W cm$^3$/sec., respectively. The alkali metal emulsion, when passed at a linear velocity of not appreciably higher than 50 cm/sec., will afford a dispersion without aggregation. If the linear velocity is too low, the rate of production is unsatisfactory. A suitable linear velocity V is from 0.1 to 50 cm/sec., preferably from 2 to 20 cm/sec.

The inside diameter R of the inner pipe is determined by the formula $\sqrt{4W/\pi V}$. Suitable pipe is commercially available. The diameter of the outer pipe is typically from 1.2 to 5 times R.

The length L of the outer pipe through which the coolant circulates varies with the linear velocity of the liquid to be cooled and the temperature of the coolant. It will be selected to be long enough to provide sufficient heat transfer to cool the alkali metal emulsion from the temperature at which it is produced to a temperature which is lower than the melting point of the alkali metal by more than 10° C, preferably by more than 20° C. The value of L usually is from 20 to 300 times as large as the inside diameter R of the inner pipe. The optimum value for a selected cooling rate can be readily calculated.

The cooler may be constructed of any material which will not react with the alkali metal or coolant employed. Ordinary steel or stainless steel may be employed.

Removal of heat from the tubular cooler may be accomplished by any of a number of well-known methods. For example, the heat may be carried away from the cooler by air, water, or a refrigerated coolant. For safety, coolants that readily react with alkali metals, e.g., water or alcohol, should not be used. Coolants such as kerosene or other oils which do not react with alkali metals and can be refrigerated will give good results.

The coolant temperature is lower than the melting point of the alkali metal to be used by at least 20° C, preferably by 30° C or more. If the alkali metal is sodium, for example, a suitable coolant temperature is between $-10°$ C and $+60°$ C, especially between 5 and 40° C.

For the alternate cooling procedure, a container or tank equipped with an agitator is employed.

The container contains a sufficient amount of a cooled liquid carrier, which may be the dispersion liquid or a previously formed metal dispersion, for receiving and rapidly cooling a hot emulsion prepared at a temperature above the melting point of the metal to a temperature at least 10° below the melting point of the metal. The cooled dispersion carrier is agitated so that the hot emulsion can be rapidly diffused to enhance rapid cooling. The cooled alkali metal dispersion thus formed may be discharged continuously or batchwise for subsequent use.

The alkali metal emulsion is desirably cooled by a coolant passing through a jacket or coil surrounding the container that receives it. Alternatively, a separate cooler may be provided for circulation of the emulsion through the cooler as well as the container. Where a decrease in the concentration of the dispersion is not objectionable, the end may be attained by introducing a precooled liquid continuously into a container receiving the alkali metal emulsion.

The particle size of the particles in the dispersion obtained in accordance with the invention is normally less than $100\mu$, and usually ranges from 1 to $30\mu$.

Since an alkali metal emulsion or dispersion reacts more readily with air, water and the like, the materials and product are handled in an atmosphere of an inert gas throughout the entire process of preparation.

The objects, features, and advantages of the invention will be better understood from the following description taken in conjunction with the accompanying drawing showing a preferred embodiment thereof. In the drawing.

Figure 1:
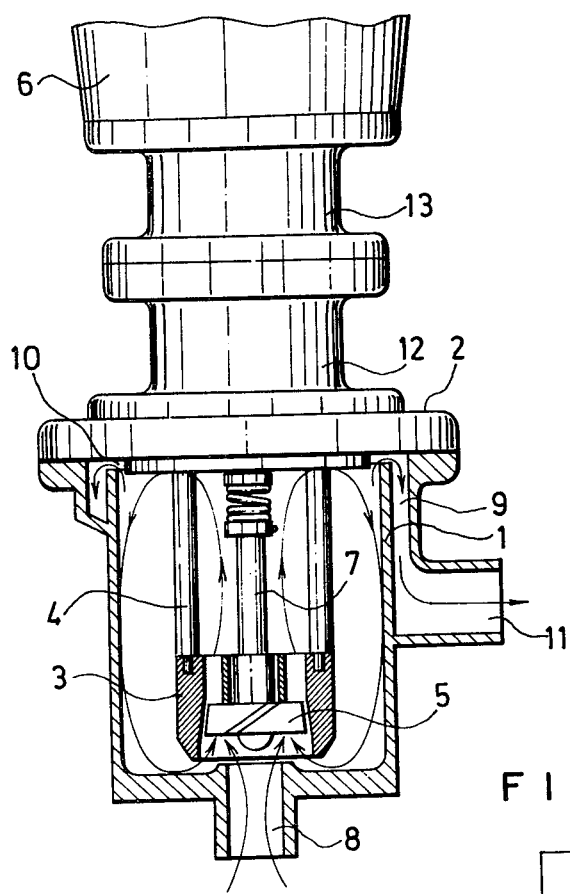
FIG. 1 is a side elevational view of a multipass emulsifier for use in the process of the invention, partly sectioned to show the essential parts.

The multipass emulsifier for use in the process of the invention is, for example, of the construction illustrated in FIG. 1.

There is shown a main cylinder 1 having a cover 2 on its top and accommodating in its lower middle space an auxiliary cylinder (hereinafter called a stator) 3 open at both upper and lower ends. The stator 3 is secured to the cover 2 by rods 4. Inside the stator 3 is located a turbine 5 for producing an upward, axial fluid flow. The turbine 5 is supported by a shaft 7 connected to a motor 6. At the bottom of the main cylinder 1 is formed an inlet 8, opposite to the lower opening of the stator 3. The upper edge of the main cylinder 1 is surrounded by a discharge trough 9, which communicates with the interior of the main cylinder 1 through an overflow gap 10 formed between the upper end of the main cylinder 1 and the cover 2. The trough 9 also communicates with an outlet 11 therebelow. Between the cover 2 and the motor 6 are disposed a bearing case 12 and a motor mounting base 13.

The operation of this emulsifier will now be briefly explained. Fluid enters the stator 3 at the inlet 8, flows upward and axially under the action of the turbine 5, flows backward and downward along the inner wall of the main cylinder 1, and reenters the stator 3, thus forming a circulating stream in the directions of arrows. A part of the circulating fluid flows over beyond the gap 10 into the discharge trough 9 and is discharged through the outlet 11.

An example of the process of the invention for preparing an alkali metal dispersion will now be described in detail with reference to FIGS. 1 to 3.

Figure 2:
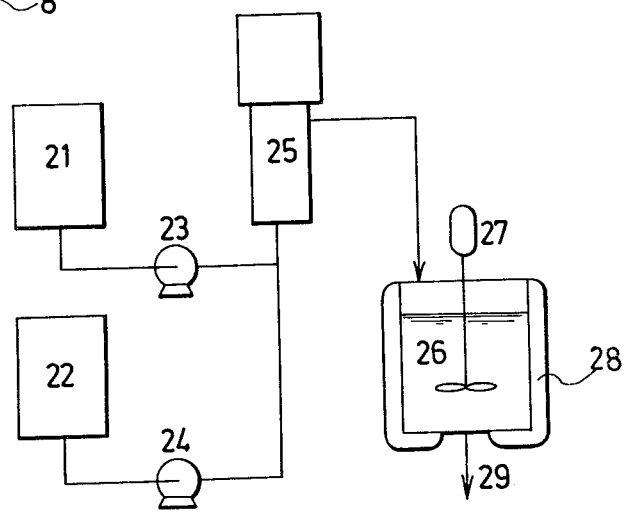
FIG. 2 is a flow sheet of a system for practicing the process of the invention.

As shown in FIG. 2, an alkali metal is fed from a molten alkali metal container 21 to a multipass emulsifier 25 by a pump 23. The line and pump for the molten alkali metal are preheated to a temperature above the melting point of the metal.

At the same time, a dispersion medium comprising a predetermined amount of a dispersing agent dissolved or dispersed in a dispersion liquid is supplied from a container 22 to the multipass emulsifier 25 by a pump 24. This dispersion medium too is preheated to a temperature above the melting point of the alkali metal.

It will be seen from FIG. 1 that the liquid to be treated, introduced into the multipass emulsifier through the inlet 8, is emulsified, forced upward, and agitated at a delivery rate from 50 to 500, preferably 80 to 300, times larger than the rate at which materials are fed to the emulsifier by the rotating turbine 5 directly coupled to the motor 6. Thus the agitation permits the liquid being treated to pass up to hundreds of times on the average through the thin gap, which measures between 0.3 and 3 mm, between the turbine 5 and the stator 3 until the liquid is finely dispersed to an emulsion form. A portion of the liquid continuously flows out through the gap 10 in the vicinity of the peripheral region at the top of the tank that is least affected by the agitation, and is then conducted through the outlet 11 into a cooling tank 26.

Desirably, the cooling tank 26 is cooled by a jacket 28 through which a coolant is circulated.

The tank is about 80% filled with a dispersion medium or alkali metal dispersion under agitation by an agitator 27. Then, the hot emulsion is continuously poured into the tank. The emulsion is rapidly cooled to a temperature more than 10° C below the melting point of the alkali metal to form a uniform alkali metal dispersion. Normally the cooling period is from one to five minutes. The alkali metal dispersion thus prepared is taken out continuously or batchwise from the outlet 29 for subsequent use.

Figure 3:
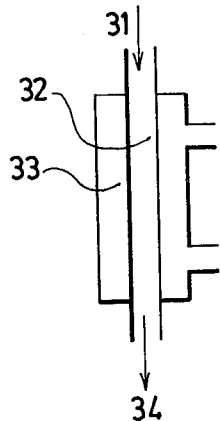
FIG. 3 is a schematic vertical sectional view of a tubular cooler for use in the invention.

FIG. 3 illustrates a typical arrangement for cooling an alkali metal emulsion by passing through a tube. The emulsion from the multipass emulsifier, still hot at a temperature above the melting point of the alkali metal, is continuously introduced through an inlet 31 into a cooling pipe 32, at such a rate that the linear velocity of the fluid will be not higher than 50 cm/sec. A coolant at a temperature lower than the melting point of the alkali metal by more than 20° C flows through a jacket 33. The alkali metal emulsion, converted to a dispersion on cooling to a temperature more than 10° C lower than the melting point of the alkali metal, is continuously removed through an outlet 34.

The following non-limiting examples are given by way of illustration only.

EXAMPLE 1

Molten sodium at a temperature of 130° C is continuously fed to a multipass emulsifier at a flow rate of 30 l/hr by an electromagnetic pump. At the same time, dispersion medium comprising kerosene as the dispersion liquid containing 0.25 wt% aluminum distearate as the dispersing agent is heated to 130° C and continuously supplied to the same emulsifier at a flow rate of 160 l/hr by another pump.

At this time, the amount of the dispersing agent aluminum distearate is 1.1 wt% on the basis of the weight of sodium, and the concentration of sodium in the system is about 18 wt%.

The multipass emulsifier has a tank capacity of 20 l, and operates with a turbine speed of 3,800 r.p.m. and a turbine delivery of about 400 l/min. The average retention time in the multipass emulsifier is about 7.5 minutes, and the average pass number is about 150.

The hot metallic sodium dispersion being continuously discharged from the multipass emulsifier is poured into a 500 l cooling tank. Prior to the start of operation, the cooling tank is 80% filled with kerosene, nitrogen gas being sealed in the upper space. The tank is equipped with an agitator located in the middle and adapted to run at 130 r.p.m. Kerosene at 0° – 10° C is circulated as a coolant through the jacket around the tank so that the solution inside is kept at 30° – 35° C.

The hot sodium dispersion is continuously allowed to fall into the tank for quick cooling. The molten sodium is instantly solidified to fine particles in dispersion at 30° – 35° C. The delivery is controlled so as to keep the cooling tank about 80% full.

This system was maintained in continuous, trouble free operation for 10 days. Thereafter, the cooler was drained of the dispersion and the interior of the empty vessel was inspected. No agglomerate of sodium was found. The sodium dispersion thus obtained was microscopically examined for the particle size distribution. The particle size ranged from 1 to 15μ, and the average particle size was 8μ.

REFERENCE EXAMPLE 1

The sodium dispersion at about 110° C obtained in the manner described in Example 1 was divided into about 3 l portions and these portions were placed in stainless steel, nitrogen sealed containers, each having a capacity of 5 l, and were cooled under different conditions as tabulated below. After cooling to ambient temperature, the resulting dispersions were discharged from the containers and the empty vessels were inspected. The results are given in the table.

| Exp. No. | Cooling method | Interior of container after removal of cooled dispersion |
|---|---|---|
| 1 | The hot dispersion was placed into a container immersed in an oil bath at 100° C, and then the container was allowed to cool, so that the dispersion was cooled from 110° C down to 60° C over 100 min. | No residual sodium was found. |
| 2 | The hot dispersion was placed into a container immersed in an oil bath at 100° C, and 30 minutes later the dispersion had cooled down to about 40° C. | Agglomerates of sodium deposited on the inner wall of the container. The deposit accounted for 12% of the total sodium. |
| 3 | The hot dispersion was placed into a container immersed in an oil bath at 100° C. With slow agitation by an agitator the dispersion was allowed to cool from 110° C down to 60° C over 100 min. | Agglomerates of sodium deposited on the blade and shaft of the agitator. The deposit accounted for 35% of the total sodium. |

It will be appreciated from the results of the comparison experiments that obtaining a cold sodium dispersion quantitatively by cooling a hot sodium dispersion is a matter of difficulty requiring an extensive period of time.

EXAMPLE 2

A lithium dispersion is prepared using an apparatus one-tenth the size of the arrangement employed in Example 1. Molten lithium at 220° C is continuously fed to a multipass emulsifier with a tank capacity of 2 l at a flow rate of 3 l/hr. At the same time, liquid paraffin as a dispersion liquid containing 0.25 wt% aluminum distearate as a dispersing agent is heated to 220° C and continuously pumped into the same multipass emulsifier at a flow rate of 16 l/hr. The emulsifier is operated with a turbine speed of 3,800 r.p.m. and a turbine delivery rate of 40 l/min.

The amount of the dispersing agent aluminum distearate is 2.2 wt% on the basis of the weight of lithium, and the lithium concentrate in the system is approximately 10 wt%.

A cooling tank having a capacity of 50 l is provided which is 80% filled with liquid paraffin, with the rest of space filled with argon gas. Kerosene at 10° – 30° C is circulated as a coolant through a jacket surrounding the tank, so that the liquid inside is maintained at a temperature not higher than 60° – 70° C. The agitator rotates at 130 r.p.m.

The hot lithium dispersion is continuously poured into this cooling tank for quick cooling. The molten lithium is rapidly solidified to form a lithium dispersion at a temperature below 60° – 70° C.

In this manner, a lithium dispersion was continuously prepared for 5 hours without any difficulty. After complete removal of the dispersion from the cooling tank, the interior was inspected. No agglomeration of lithium was observed.

The particle size distribution of the lithium dispersion thus obtained was microscopically determined. The particle size ranged from 3 to 20μ, and the average particle size was 12μ.

EXAMPLE 3

The same apparatus as described in Example 1 was used, and molten sodium was fed at a rate of 25 l/hr and kerosene as the dispersion liquid was fed at a rate of 135 l/hr. Aluminum distearate was employed as the dispersing agent. Its concentration was adjusted to 0.20 wt% on the basis of the weight of the kerosene. The concentration of the sodium dispersion in the kerosene was 18 wt%, and the concentration of aluminum distearate based on the weight of sodium was 0.9 wt%. The multipass emulsifier was maintained at 115° C. All other conditions were the same as in Example 1 except that a tubular cooler was used in place of the tank type. Thus, the sodium emulsion prepared by the multipass emulsifier was passed through a 3 m-long double-pipe cooler measuring 2.5 cm in inner pipe diameter and 5 cm in diameter of the outer pipe for coolant, at a linear velocity of about 9 cm/sec. Kerosene at 5° - 10° C was circulated as the coolant through the outer pipe. The temperature of the emulsion was 115° C at the inlet of the tubular cooler and 30° -50° at the outlet.

Because of its melting point of 97.8° C, the molten sodium solidified midway in the cooling pipe.

The dispersion thus prepared had a particle size ranging from 1 to 16μ and an average particle size of 8μ.

REFERENCE EXAMPLE 2

The procedure of Example 3 was repeated with the exception that the inner pipe diameter of the tubular cooler was only 1.0 cm, and the sodium emulsion was passed through at a linear velocity of about 57 cm/sec. The particle size of the resulting sodium dispersion ranged from 1 to 200μ.

When a 0.8 cm-dia. inner pipe was used and the sodium emulsion was passed through at a linear velocity of about 88 cm/sec., the inner pipe clogged in 10 minutes.

What is claimed is:

1. A process for preparing alkali metal dispersions which comprises continuously feeding a molten alkali metal, a dispersing agent and an inactive dispersion liquid to a multipass emulsifier to form an emulsion of the molten alkali metal, and continuously transferring the resulting emulsion into a container containing a sufficient quantity of a liquid carrier under agitation thereby rapidly cooling the emulsion to a temperature at least 10° lower than the melting point of the alkali metal; the said emulsifier comprising a main cylinder having a cover on its upper end, an auxiliary cylinder located with upper and lower ends open in a middle lower part of the space inside the main cylinder, and a turbine mounted in the auxiliary cylinder to form an upward axial fluid flow, said main cylinder having an inlet formed in the portion facing the bottom of the auxiliary cylinder and also having an overflow gap provided between the entire upper periphery of the main cylinder and the cover and communicated with a discharge pipe surrounding the main cylinder.

2. A process for preparing alkali metal dispersions which comprises continuously feeding a molten alkali metal, a dispersing agent, and an inactive dispersion liquid to a multipass emulsifier to form an emulsion of the molten alkali metal, and causing the resulting emulsion to flow through a tubular cooler at a linear velocity up to 50 cm/second, thereby cooling it to a temperature at least 10° C lower than the melting point of the alkali metal; the said emulsifier comprising a main cylinder having a cover on its upper end, an auxiliary cylinder located with upper and lower ends open in a middle lower part of the space inside the main cylinder, and a turbine mounted in the auxiliary cylinder to form an upward axial fluid flow, said main cylinder having an inlet formed in the portion facing the bottom of the auxiliary cylinder and also having an overflow gap provided between the entire upper periphery of the main cylinder and the cover and communicated with a discharge pipe surrounding the main cylinder.

3. A process as defined in claim 2, wherein said tubular cooler comprises an interior cooling pipe with an exterior jacket and is adapted to circulate a coolant through said jacket.

4. A process as defined in claim 1 wherein said alkali metal is sodium.

5. A process as defined in claim 1 wherein said alkali metal is lithium.

6. A process as defined in claim 2 wherein said alkali metal is sodium.

7. A process as defined in claim 2 wherein said alkali metal is lithium.

* * * * *